Aug. 1, 1950   M. M. GEORGION   2,517,196
COMPUTING AND MEASURING INSTRUMENT
Filed May 27, 1949   2 Sheets-Sheet 1

Inventor
MELTON M. GEORGION
by William H. Parrett Jr.
his
Attorney

Aug. 1, 1950     M. M. GEORGION     2,517,196
COMPUTING AND MEASURING INSTRUMENT
Filed May 27, 1949     2 Sheets-Sheet 2

Inventor
MELTON M. GEORGION
by William H. Parrot, Jr.
his Attorney

Patented Aug. 1, 1950

2,517,196

UNITED STATES PATENT OFFICE 2,517,196

COMPUTING AND MEASURING INSTRUMENT

Melton Michel Georgion, Washington, D. C.

Application May 27, 1949, Serial No. 95,605

3 Claims. (Cl. 235—70)

This invention relates to improvements in computing and measuring instruments of the type particularly used in aerial navigation.

Up to the present time aerial navigation has been accomplished by employing a computing instrument to determine speed, distance and time and to make various corrections for instrument inaccuracies occasioned by variations in the temperature of the air and air pressure. The resulting computations are then applied to a chart or map by means of a pair of dividers, a straight edge ruler and with reference to a compass rose. Navigation by these means is difficult of performance in single place high speed aircraft where the pilot is required to keep at least one hand on the "stick."

It is the object of my invention to provide a single instrument which may be manipulated in one hand of the pilot and which may serve to perform the following functions:

To solve problems involving speed, distance and time when any two of these variables are known; to effect conversion of nautical miles to statute miles and vice versa; to permit immediate laying out of computed distances on any standard map; to obtain corrected altitude when pressure altitude and free air temperature are known; to obtain "true" air speed when pressure altitude and free air temperature are known; to find density altitude when pressure altitude and free air temperature are known.

With these objects in mind the following is a description of my novel, improved computing measuring instrument.

Figures 1, 2, 3:
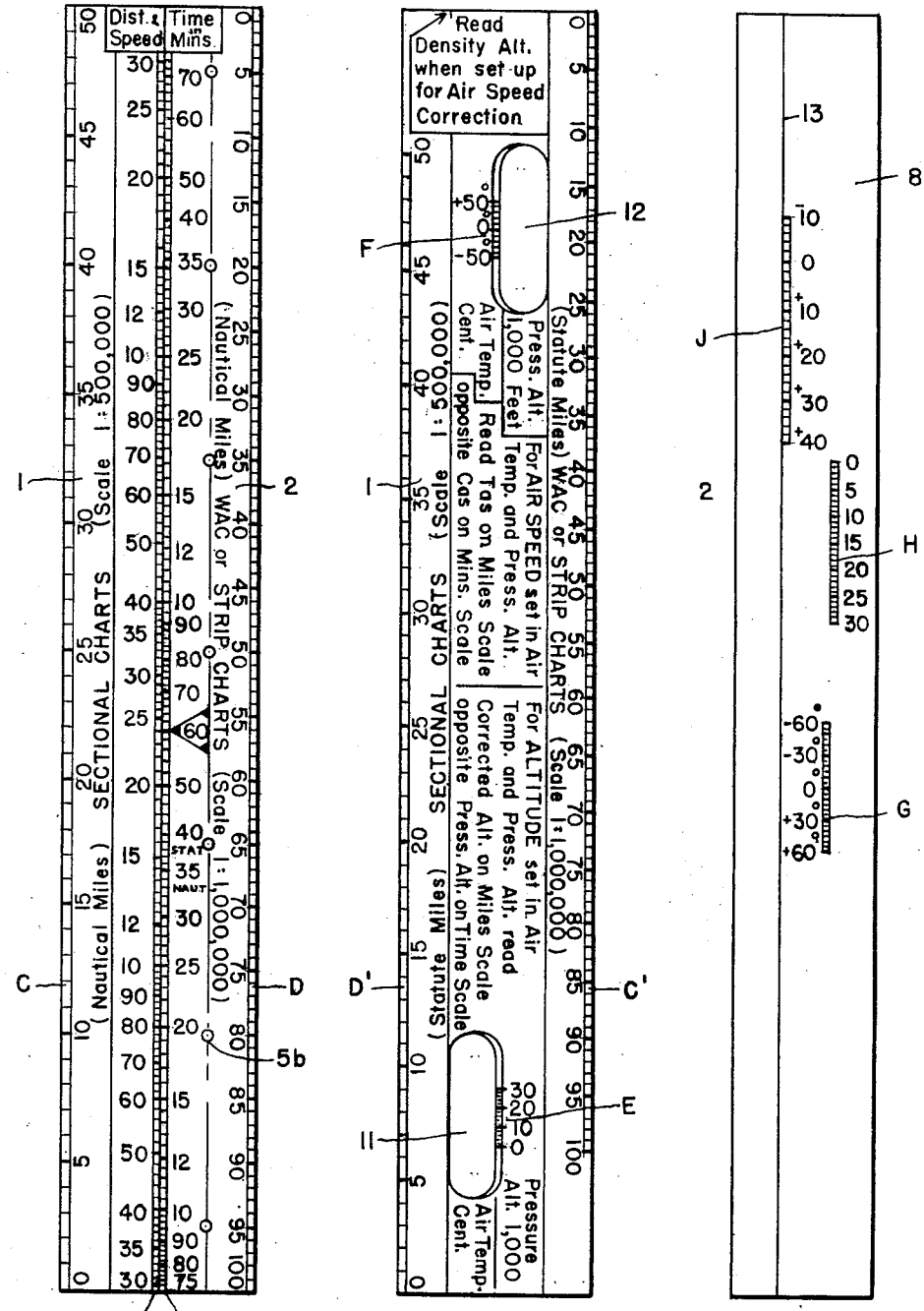
Fig. 1 is a plan view of my instrument showing all the scales appearing on the upper face thereof.
Fig. 2 is a view of the underside of my instrument.
Fig. 3 is a view of the underside of the slidable member removed from the stationary member.
Figure 1A:
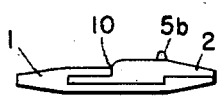
Fig 1a is an end view thereof.
Figure 5:
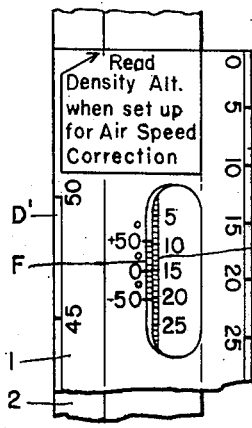
Fig. 5 is a view of the upper end of my instrument showing the slidable member extended partially upwardly to utilize the scales F, H and J shown thereon.
Figure 7:
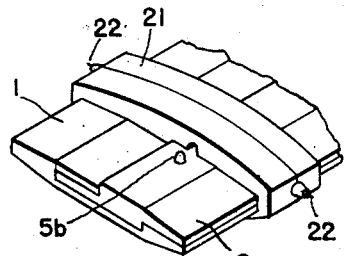
Fig. 7 shows a marking device which I may attach to my instrument.
Figure 6:
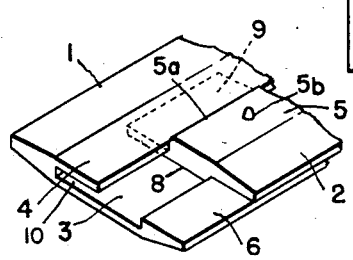
Fig. 6 is a perspective view showing the construction of the interlocking slidable and stationary members.

Referring to Fig. 1, it will be observed that the upper face of my instrument consists of four different scales which I have labeled A, B, C and D. Scales A and B are logarithmic scales of identical linear periods but represent different segments thereof. The particular segments chosen and their placement with respect to each other I determine by considering the average probable speed of the aircraft in time-distance-speed problems for the solution of which my instrument is likely to be employed, and setting up the scales to solve such problems with a minimum of relative motion. In the embodiment illustrated in Fig. 1, I have considered 240 miles per hour or 240 knots, as the average probable speed. In this connection see Problems 1 and 2 discussed below. If the instrument is to be employed normally in solving problems involving higher speed aircraft, for convenience a different segment may be chosen for scale A. However, the particular segments and the placement of the scales A and B is not critical, and all problems may be solved on any pair of scales which consist of at least one I through 10 segment. Scales C and A are on a stationary member 1, the detailed construction of which is partially illustrated in Fig. 6. Scales B and D are contained on a slidable member 2 the construction of which is also illustrated in Fig. 6. It should be noted at this point that the stationary member I is provided with a channel 3 which extends partially inwardly and under the overhung raised face 4 of said stationary member I. The slidable member 2 is provided with an upper portion 5 which slides along and rests partially on lesser raised portion 6 of the stationary member I. The combined altitudes of the last mentioned raised portion 6 and of the upper portion 5 of the slidable member are slightly in excess of the total altitude of the overhung raised portion 4. The inner edge 5a is beveled to the plane of the overhung raised portion 4 so that their scales mate. The two members I and 2 move only longitudinally with respect to each other. The remainder of the slidable member 2 is comprised of a parallel base segment 8 which fits in the channel 3 and is effectively secured therein against other than longitudinal movement by the tongue 9 and the groove 10, the latter being formed by part of the overhung raised face 4. The slidable member is of such dimensions relative to the receiving portions of the stationary member as to provide a close fit so that movement relative to each other is entirely inhibited except under firm digital pressure. To assist the fingers and palm of the hand of the operator in gripping the instrument to provide requisite pressure for relative movement, I have also provided on slidable member 2 a series of small knobs 5b. In addition, I may provide slidable marking means such as are illustrated in Fig. 7 in case the operator should actually desire to mark his position on his chart, or may be required to measure a distance in excess of the maximum scaled on any one length of the instrument (scales C, D, C', D'). As an illustration of a possible type of marking means, I have shown a sleeve 21 containing a small graphite point 22 on each side which sleeve fits over and slides along the entire instrument.

Scales A and B, being logarithmic, enable the operator of the instrument to compute distance and speed against time in minutes. For convenience I have marked scale A as indicating speed and distance and scale B as indicating time in minutes. To this end I have placed an arrowhead at 60 on scale B which indicates the number of minutes in the hour. It will also be noted that I have provided on scale B markers for comparison of both statute and nautical miles so that in any instance where one of these is known, conversion to the other may be easily effected. The letters Stat. indicates statute miles; Naut. nautical miles.

Scale C is placed along the outside edge of the stationary member 1 and is calibrated to indicate nautical miles on sectional aeronautical charts, the scale of which is 1 to 500,000. Scale D is placed along the outer edge of the upper portion 5 of the slidable member 2 and is calibrated to indicate nautical miles on world aeronautical charts which employ a scale of 1 to 1,000,000. It is obvious that different scales may be substituted where the instrument is to be used on different types of charts. However to obviate the necessity of changing scales I have provided two additional calibrations on the backside of the stationary member 1 (scales C' and D' shown in Fig. 2). Scale D' is calibrated to measure statute miles on sectional aeronautical charts; scale C', statute miles on the world aeronautical chart.

As may be seen from Fig. 2, windows 11 and 12 have been cut lengthwise in the underside of the stationary member 1. Along the edge of window 11, I have placed a logarithmic scale E which indicates pressure altitude in thousandths of feet. Along the side of the upper window 12 I have placed a logarithmic scale F which indicates air temperature in degrees centigrade. It should be noted that the windows 11 and 12 are so placed as to view opposite lengthwise halves of the back face of the parallel base segment 8. By this construction I prevent the operator of the instrument from becoming confused by bringing together the wrong scales.

Fig. 3 shows the scales appearing on the back face of the base segment 8. On the left hand side at the lower portion is a logarithmic scale G which indicates air temperature centigrade. This scale is so placed as to cooperate with scale E and the logarithmic scales A and B referred to above whereby, if pressure altitude in thousands of feet and air temperature centigrade are known, the operator may ascertain corrected altitude by consulting scale A opposite the pressure altitude reading on scale B.

The proper periods of each of the scales mentioned and their placement relative to each other may be ascertained by employing principles well known to the art. For a discussion of these principles, Patent No. 1,918,188, dated July 11, 1933, issued to George P. Luckey, and Patent No. 2,394,563, dated February 12, 1946, issued to George H. Purcell, may be consulted.

On the right hand side of segment 8, I have placed a scale indicating pressure altitude in thousands of feet (scale H). When this scale is set against scale F, density altitude may be read from scale J along the upper edge 13 of the back of stationary member 1. Scale H is likewise placed with respect to the logarithmic scales A and B so that true air speed may be read on scale A by consulting the calibrated air speed on scale B after setting pressure altitude and air temperature (scales F and H) at the known values.

The proper periods of each of these scales and their placement relative to each other may also be ascertained by reference to principles well known to the art. See Patent No. 2,342,674, issued February 29, 1944, issued to Ezra Kotcher.

The simplicity of my instrument and the ease with which it may be manipulated in one hand may be illustrated by working out the following problems:

Problem 1

Given a speed of 240 knots, a distance of 100 miles covered by the plane—calculate time required. Solution:

The indicator at 60 on scale B is set opposite 240 on scale A. Opposite distance 100 on scale A read time required in minutes, i. e. 25 (Fig. 1). This may be represented by the formula 60 : 240 : : x : 100 or 60 : speed : : time : distance.

Problem 2

Given a speed of 240 knots and a time of 10 minutes, find and mark down on chart distance covered. Set scale indicator 60 (scale B) opposite 240 (scale A); then opposite 10 on scale B find on scale A answer 40, or 40 miles (Fig. 1). This last answer may now be marked off on the map from the point of beginning, by laying the edge with scale appropriate to the map on the latter and noting the distance either mentally by observation, or if the marker shown in Fig. 7 and described above is employed on the instrument, by making an indication (either a point or other mark) on the map.

Problem 3

Figure 8:
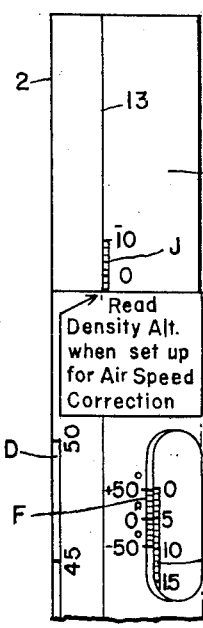
Figs. 8, 8a, 9 and 9a, illustrate two types of problems which may be solved with my instrument.
Figure 8A:
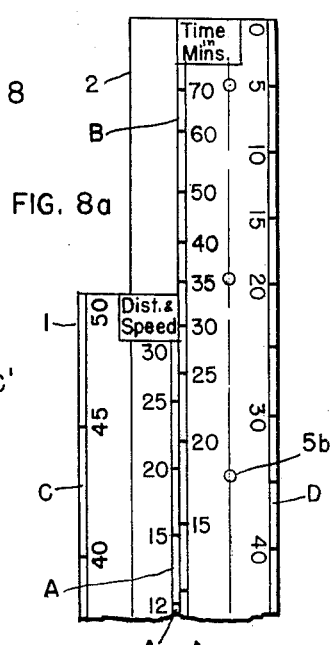
Figure 4:
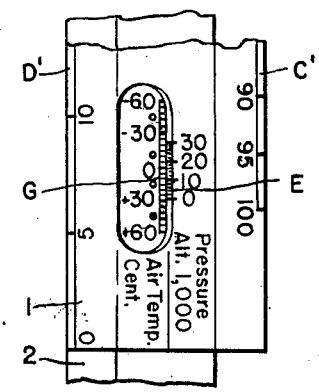
Fig. 4 is a view of the lower end of my instrument in which the slidable member is partially extended downwardly to utilize the G and E scales shown thereon.

Given air temperature of 0° C., pressure altitude 5000 feet, calibrated air speed 150 M. P. H., find true air speed and density altitude. Set 5000 (scale H) opposite 0 (scale F, Fig. 8), turn over instrument and read opposite 150 on scale B, 160 on scale A (Fig. 8a). This is true air speed. On scale J, 4500 feet density altitude may be read directly (Fig. 8).

Problem 4

Figure 9:
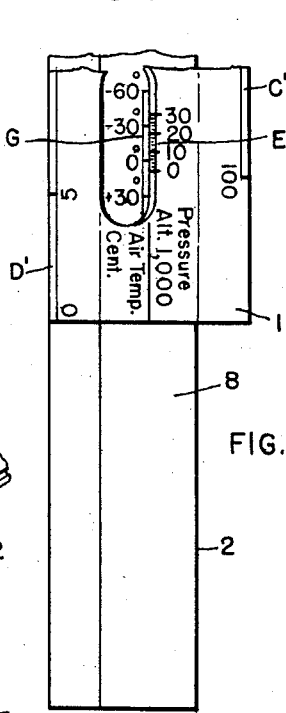
Figure 9A:
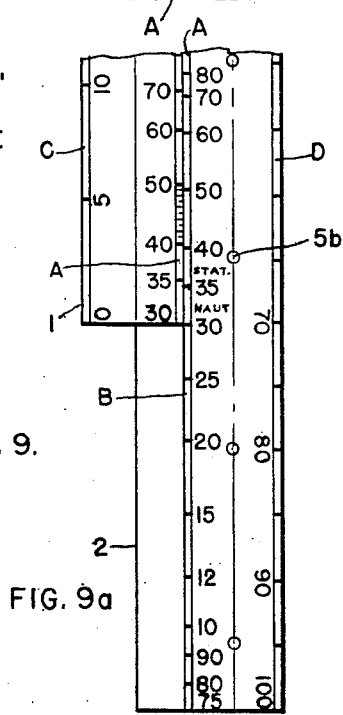

Given temperature 0°, pressure altitude 5000 feet, find corrected altitude. Move 0 on scale G opposite 5 on scale E (Fig. 9), turn over instrument and read corrected altitude on scale A opposite 50 on scale B, viz. 4900 feet (Fig. 9a).

From the foregoing, it will be noted that my instrument serves a variety of useful purposes in the hands of a pilot or other navigator who is required to make quick calculations of the type described and to measure distances on standard charts. It is obvious that the results of calculations of this nature are only reasonably accurate, the accuracy being largely a function of the size of the scales employed. For easy hand use, I have regarded an instrument of between 7 and 10 inches as ideal.

Having described my invention, I claim:

1. A computing instrument comprising a flat linear containing stationary member, said stationary member having a backing portion, a raised half face portion along one edge of said backing portion and a channel in the half face side of said backing portion extending partly into and below said raised portion, and a linear slidable member cooperating with said stationary member, said slidable member itself comprising a parallel base segment adapted to fit and slide within the said channel of the stationary member, and a half-face portion fixed on said base segment, said last mentioned portion having an edge adjacent the inner edge of the half face portion of the stationary member, and said backing portion of the stationary member being provided with a window through which may be viewed the back side of the said parallel base segment of the slidable member, a pair of logarithmic scales of similar linear periods, one of said pair of scales being placed along the inner edge of the half-face portion of the stationary member, and the other of said pair of scales being placed along the adjacent edge of the half-face portion of the slidable member, a logarithmic air temperature scale provided on the back side of said parallel base segment viewable through said window, a logarithmic pressure altitude scale on the back side of the stationary member, adjacent said window, said air temperature and pressure altitude scales being placed relative to said pair of logarithmic scales, and said pair of scales being placed linearly in relation to each other as to indicate opposite the value of calibrated air speed on one of said pair of scales, true air speed on the other of said pair of scales with the setting of the said air temperature and pressure altitude scales to known values.

2. A computing instrument comprising a flat linear containing stationary member, said stationary member having a backing portion, a raised half face portion along one edge of said backing portion and a channel in the half face side of said backing portion extending partly into and below said raised portion, and a linear slidable member cooperating with said stationary member, said slidable member itself comprising a parallel base segment adapted to fit and slide within the said channel of the stationary member, and a half-face portion fixed on said base segment, said last mentioned portion having an edge adjacent the inner edge of the half face portion of the stationary member, and said backing portion of the stationary member being provided with a window through which may be viewed the back side of the said parallel base segment of the slidable member, a pair of logarithmic scales of similar linear periods, one of said pair of scales being placed along the inner edge of the half-face portion of the stationary member and the other of said pair of scales along the adjacent edge of the half-face portion of the slidable member, a logarithmic pressure altitude scale provided on the back side of the said parallel base segment viewable through said window, a logarithmic temperature scale on the backside of said stationary member adjacent said window, said pressure altitude and temperature scales being placed relative to said pair of scales and said pair of scales being placed relative to each other as to indicate opposite the value of calibrated altitude on one of the said pair of scales true altitude on the other of said pair of scales with the proper setting of said pressure altitude and temperature scales to known values.

3. A computing instrument comprising a flat linear containing stationary member, said stationary member having a backing portion, a raised half face portion along one edge of said backing portion and a channel in the half face side of said backing portion extending partly into and below said raised portion, and a linear slidable member cooperating with said stationary member, said slidable member itself comprising a parallel base segment adapted to fit and slide within the said channel of the stationary member, and a half-face portion fixed on said base segment, said last mentioned portion having an edge adjacent the inner edge of the half face portion of the stationary member, and said backing portion being provided with a window on each longitudinal half side thereof, through which may be viewed the back side of the said parallel base segment of the slidable member, a pair of logarithmic scales of similar linear periods, one of said pair of scales being placed along the inner edge of the half-face portion of the stationary member and the other of said pair of scales along the adjacent edge of the half-face portion of the slidable member, a logarithmic air temperature scale provided on the back side of the said parallel base segment viewable through one of said windows, a logarithmic pressure altitude scale on the backside of the stationary member adjacent said window, a second logarithmic pressure altitude scale provided on the backside of said parallel base segment viewable through the second window, a logarithmic temperature scale on the back side of the stationary member adjacent the second window, and a logarithmic density altitude scale related to both the second said pressure altitude and temperature scales and readable from settings thereof, said density altitude scale also located on the back of said parallel base segment, both said temperature and pressure altitude scales being placed relative to the pair of logarithmic scales and said pair of logarithmic scales being placed linearly in relation to each other as to indicate opposite the values of calibrated air speed on one of said pair of scales true air speed on the other of said pair of scales, and opposite the value of calibrated altitude on one of said pair of scales corrected altitude on the other said pair of scales with the setting of said air temperature and pressure altitude scales to known values.

MELTON MICHEL GEORGION.

REFERENCES CITED

The following references are of record in the file of this patent:

UNITED STATES PATENTS

| Number | Name | Date |
| --- | --- | --- |
| 460,930 | Cox | Oct. 6, 1891 |
| 833,168 | Keller | Oct. 16, 1906 |
| 880,907 | Nickel | Mar. 3, 1908 |
| 884,729 | Grondahl | Apr. 14, 1908 |